4436

Reissued Jun 27 1871

Witnesses:
Joel Tiffany
O. H. Daniel

Inventor:
E. D. Brainerd

N.Y. PHOTO-LITHOGRAPHIC CO. N.Y. (OSBORNE'S PROCESS.)

UNITED STATES PATENT OFFICE.

EDWIN D. BRAINARD, OF ALBANY, NEW YORK.

IMPROVEMENT IN APPARATUS FOR REFRIGERATING AND DESICCATING.

Specification forming part of Letters Patent No. 73,292, dated January 14, 1868; reissue No. 4,436, dated June 27, 1871.

DIVISION A.

*To all whom it may concern:*

Be it known that I, EDWIN D. BRAINARD, of the city and county of Albany and State of New York, have invented a new and useful Improvement in Apparatus for Desiccating and Refrigerating Purposes, to be used for preserving animal and vegetable substances, and for brewing and other purposes.

This apparatus is useful in the construction of ice-chambers, refrigerating-chambers, domestic refrigerators, fermenting-chambers, store-rooms for preserving, railroad-cars and other vehicles used for transportation, and for all rooms and boxes for storing, transporting, and keeping sound and fresh fruits, vegetables, meats, butter, lard, and other similar materials. Such apparatus is also useful in the construction of rooms used in breweries for fermenting and storing ale, beer, and for storing ice, and for all purposes where a low even temperature and dry atmosphere is required. When applied to the ice-chamber it produces a dry atmosphere and prevents all back-drip; and when the ice-chamber is completely insulated from the influence of the surrounding or outside atmosphere it maintains in the chamber a dry atmosphere at the temperature of 34°, which atmosphere is always fit for use in other chambers, for the purpose of moderating the temperature of such other chambers. When applied to fermenting-chambers the heat and moisture arising from the fermenting liquors are arrested by condensation upon the inclined surfaces of the metallic ceiling, and are conveyed from the chamber by the drip-gutters and pipes arranged for that purpose, so as to keep the chamber dry and sweet. Should the heat generated by fermentation become too great for safety in the fermenting-chamber, the dry cold air of the ice-chamber, standing at 34° Fahrenheit, can be admitted at pleasure to regulate the temperature to any desired degree above 34°. My improved apparatus consists in applying corrugated or inclined metallic surfaces for ceilings of rooms or chambers, so combined with drip-gutters as to condense upon such inclined surfaces the moisture contained in the atmosphere in such chambers or rooms, which moisture, so condensed, drips into the gutters, and is thence conveyed by gutters and pipes out of the chamber.

Figure 1:
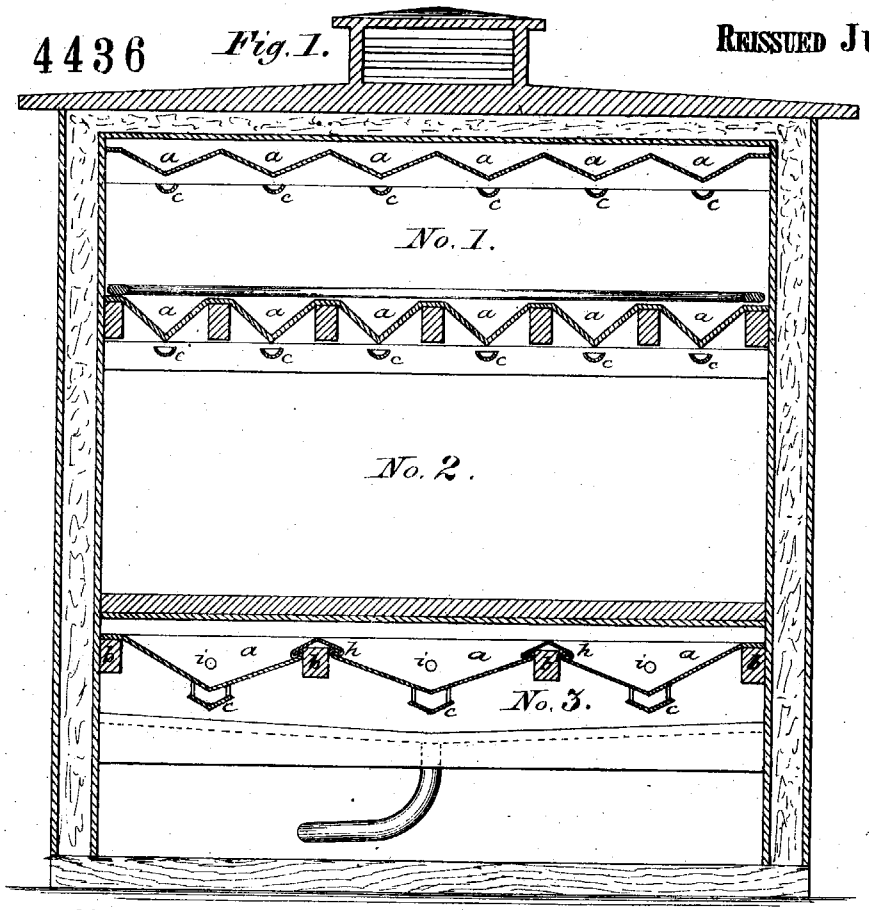
Figure 2:
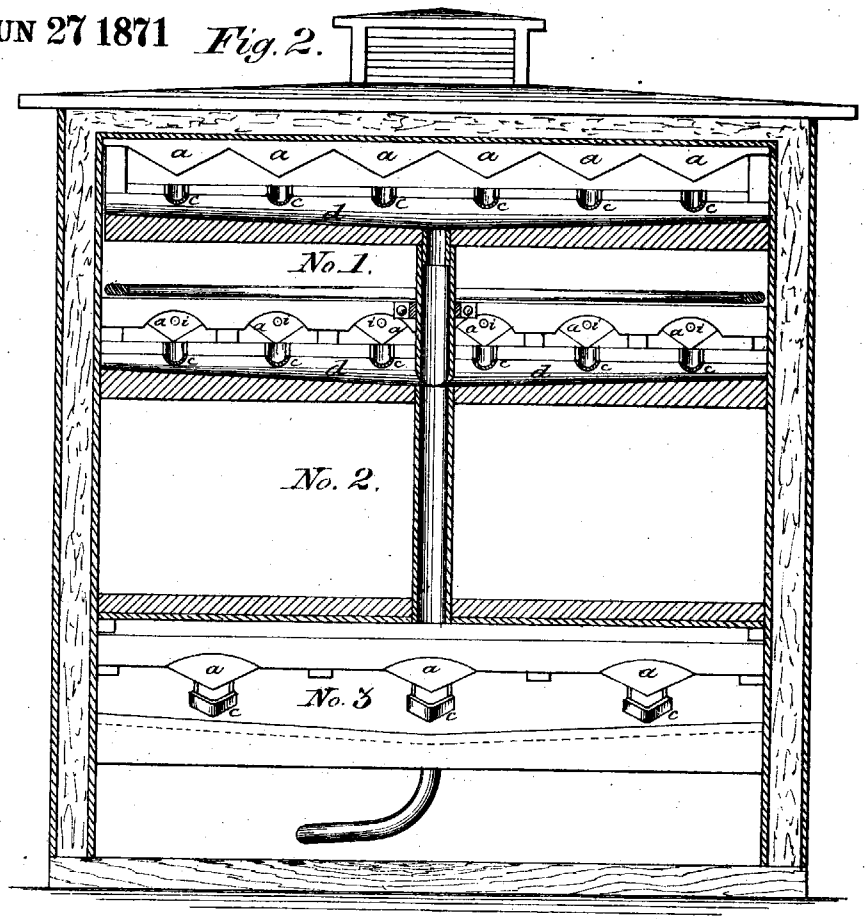
Figure 3:
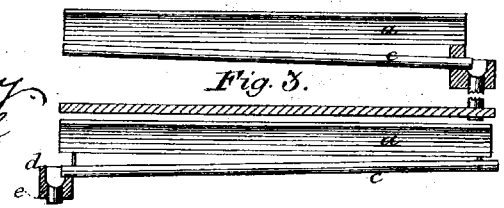

In the accompanying drawing, Figure 1 represents a room or rooms, to which my corrugated or inclined metallic surfaces are applied as a ceiling. In such figure the metallic corrugations or inclines are seen at *a a a a a*, the corresponding gutters are seen at *c c c c c*. In said figure No. 1 represents the ice-chamber. No. 2 represents the storage or fermenting-chamber. No. 3 represents the same as No. 2, showing the manner in which the corrugations are attached to the beams and connected with and covered by the caps at *h h*.

Figure 4:
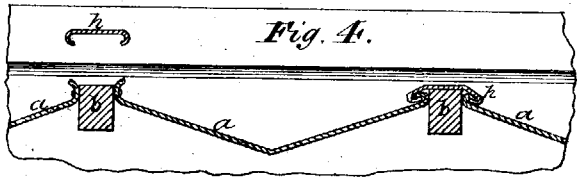

The particular manner of attaching the corrugated iron ceiling to the timbers and the manner of making the union of the caps with these corrugations are represented in Fig. 4 of the accompanying drawing.

The manner in which my improvement operates to produce the desired effect is as follows: The warm air in the room or chamber rises in right lines to the ceiling and comes in contact with these inclined metallic surfaces *a a a*, &c., upon which the moisture contained in the atmosphere is condensed, and from which it drips into the gutters *c c c c*, &c., and is by them discharged into cross-gutters and thence into pipes and conveyed from the chamber. In this manner, whenever from any cause the temperature in the chamber is increased, these ascending currents take place, and the moisture contained in these currents is deposited upon these metallic inclines and disposed of as above described.

Reference is hereby given to the accompanying drawing containing Figs. 1, 2, 3, and 4, in which figures the same letters refer to the same parts of my apparatus.

Having thus fully explained the nature and operation of my said improvement, I desire to secure by Letters Patent the following claims:

1. The condensing and refrigerating inclined metallic surfaces combined with drip-gutters, arranged substantially in the manner and for the purposes above described.

2. The method of forming the condensing inclines by uniting the sides to a cap with closed double seams, substantially as described.

EDWIN D. BRAINARD.

Witnesses:
JOEL TIFFANY,
O. MACDANIEL.